(12) United States Patent
Schroth et al.

(10) Patent No.: US 8,350,179 B2
(45) Date of Patent: Jan. 8, 2013

(54) APPLICATION OF SURFACE RELIEF TO SPOT WELDING ELECTRODES

(75) Inventors: James G. Schroth, Troy, MI (US); David R. Sigler, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 657 days.

(21) Appl. No.: 12/605,531

(22) Filed: Oct. 26, 2009

(65) Prior Publication Data

US 2011/0094999 A1 Apr. 28, 2011

(51) Int. Cl.
*B23K 11/00* (2006.01)
*B24B 1/00* (2006.01)
*B23H 1/00* (2006.01)

(52) U.S. Cl. ............... 219/117.1; 219/69.17; 451/28
(58) Field of Classification Search ............... 219/117.1, 219/119
See application file for complete search history.

(56) References Cited

U.S. PATENT DOCUMENTS

| | | | | |
|---|---|---|---|---|
| 4,194,667 A | * | 3/1980 | Cook et al. | 228/4.1 |
| 4,288,024 A | * | 9/1981 | Nippert | 228/155 |
| 4,972,047 A | * | 11/1990 | Puddle et al. | 219/118 |
| 5,304,769 A | * | 4/1994 | Ikegami et al. | 219/119 |
| 6,861,609 B2 | * | 3/2005 | Sigler | 219/117.1 |
| 7,458,139 B2 | * | 12/2008 | Nakazima | 29/33 R |
| 8,274,010 B2 | | 9/2012 | Sigler et al. | |
| 2006/0081563 A1 | * | 4/2006 | Ueda et al. | 219/119 |
| 2008/0078749 A1 | * | 4/2008 | Sigler et al. | 219/119 |
| 2009/0127232 A1 | * | 5/2009 | Sigler et al. | 219/117.1 |
| 2009/0255908 A1 | * | 10/2009 | Sigler et al. | 219/91.2 |
| 2009/0302009 A1 | * | 12/2009 | Sigler et al. | 219/117.1 |

FOREIGN PATENT DOCUMENTS

WO 8810167 A1 12/1988
WO WO 8810167 A1 * 12/1988

OTHER PUBLICATIONS

Translation of official office action issued on May 13, 2011 for Swedish patent application No. 1051066-7.

* cited by examiner

*Primary Examiner* — Ha Tran T Nguyen
*Assistant Examiner* — Jordan Klein
(74) *Attorney, Agent, or Firm* — Reising Ethington P.C.

(57) ABSTRACT

The workpiece-contacting surface of the spot welding electrode may be suitably modified to incorporate a desired shape or form, generally comprising a depressed region outlining a recognizable shape, to form aesthetically-pleasing or functional features in the surface of a workpiece during resistance spot welding. Methods for creating the desired form in the spot welding electrode including abrasion, upsetting, and electrical discharge machining are disclosed. Preferably the electrode face is shaped and subsequently redressed during welding operations at the welding station.

15 Claims, 4 Drawing Sheets

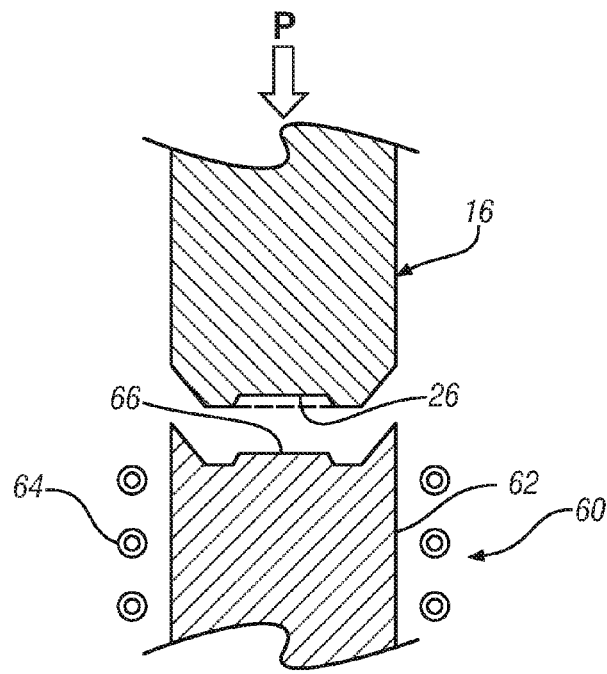
FIG. 5
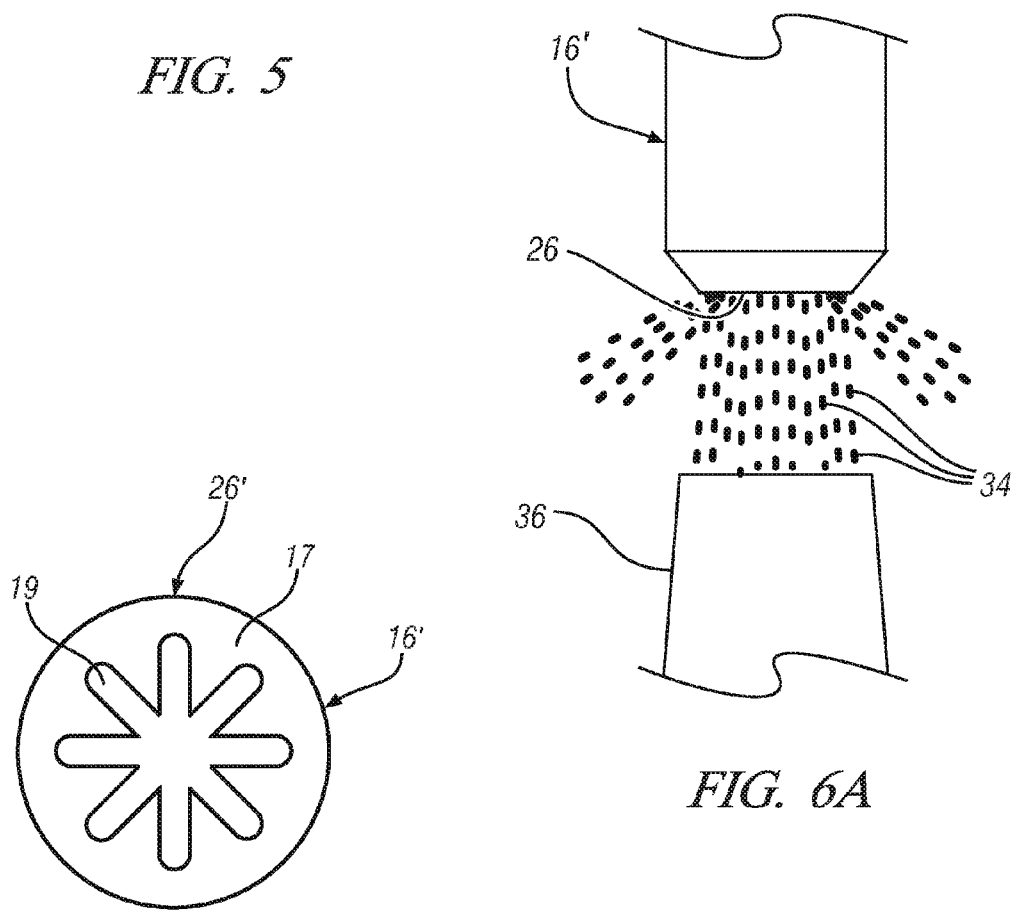
FIG. 6A
FIG. 6B

APPLICATION OF SURFACE RELIEF TO SPOT WELDING ELECTRODES

TECHNICAL FIELD

This invention relates to methods for the application of a surface relief image or pattern on the welding face of a spot welding electrode so that a functional and aesthetically pleasing pattern may be repeatedly imparted to surfaces of spot welded workpieces. In many embodiments, this invention pertains to the formation of such images on the welding face where the image does not consist of features of circular symmetry centered about the weld face of the electrode.

BACKGROUND OF THE INVENTION

Resistance spot welding is a joining process that is used in many manufacturing processes for making automotive vehicle bodies and other vehicle members. For example, it is used for welding sheet metal inner and outer closure panels (like doors, decklids, liftgates, and hoods) to one another by a series of spot welds at suitable locations on the workpieces. The sheet metal material may be a steel alloy, a galvanized steel, an aluminum alloy, a magnesium alloy, or the like. Assemblies of such workpieces are successively brought to a welding cell (or station) where spot welds are made by one or more pairs of opposing, water-cooled, high conductivity, copper alloy electrodes carried by a welding apparatus. The welding apparatus may be robotic and controlled to clamp and press facing spot welding electrodes against opposite sides of the workpieces and deliver a momentary welding current through the electrodes and workpieces to form a weld between facing surfaces of the metal pieces. The welding apparatus opens the electrodes and advances them (or the workpieces) progressively to make a succession of such welds.

The electrodes are typically round cylinders with one end (a shank end) held in the welding apparatus while the other end presents a weld face that is pressed into electrical contact with a surface of a workpiece. The electrodes are held, generally axially aligned, with their weld faces in opposing, facing relationship. These faces are intended to contact surfaces of one or more metal workpieces and produce a suitable weld nugget.

Electrode faces for spot welding steel have been formed with a spherical domed shape which may be generally concentric with the cylindrical axis of the round electrode body. The domed shape may have been machined with a flat for contacting a steel surface. But these weld faces leave a sharp imprint on the steel surface that can have excessive indentation and/or an unsightly, uneven angle with the workpiece surface. Such an electrode shape is prone to causing sheet deformation around the weld that is unattractive. Also, metal expulsion from the sheet surface can lead to undesirable whiskers or fingers of metal protruding from the sheet surface.

Three co-pending U.S. patent applications, assigned to the assignee of this invention, disclose welding electrodes that form high quality spot welds in metal workpieces. In addition to forming high quality spot welds in steel workpieces, galvanized steel workpieces, aluminum alloy workpieces, or magnesium workpieces, these electrodes form a recognizable image, an attractive image, at the weld site. Viewers of such welded articles have considered these images to have high perceived quality; that is they have a visual appearance which is interpreted as indicating high quality. These applications are No. 11/536,001 (Pub. No. US 2008/0078749), filed Sep. 28, 2006 and titled "Welding Electrode with Contoured Face"; No. 12/251,636, filed Oct. 15, 2008 and titled "Weld Electrode for Attractive Weld Appearance"; and No. 12/356,613, filed Jan. 21, 2009 and titled "Weld Electrode for Attractive Weld Appearance." These applications disclose the use of protrusions or intrusions in the round (plan view) shaped electrode face. When the shaped end of the electrode engages the workpiece and current flow starts, the protrusions and/or intrusion shapes on the face form complementary (reversed) visible and recognizable weld site images in the weld-heat softened surface of at least one sheet contacted by the electrodes. These images are machined or otherwise formed in the face of one or both of the co-acting copper alloy electrodes. Sometimes the images are in the form of elevated or depressed rings or other geometric shapes in the surface of the electrode face that are concentric with the center of the weld face and commonly concentric with the axis of the electrode. Other visible images may be in the form of letters or icons that are not circular or, if circular, they are not centered on the axis of the round weld face. Preferably such images are formed at weld sites in visible surfaces of articles of manufacture, such as automotive vehicle body surfaces.

This disclosure advances the use of such electrodes by facilitating the shaping or forming of initial electrode weld faces (the workpiece contacting surfaces of the electrodes) and their redressing after welding operations have eroded weld face images.

SUMMARY OF THE INVENTION

The invention provides methods to quickly and efficiently introduce specific patterns onto welding face surfaces of resistance welding electrodes. Prior work in this area emphasized the use of rotating dressing blades to produce axisymmetric patterns that are centered on welding electrode faces. However, in general, more complex patterns may be desirable for specific applications. In preferred embodiments of the invention, additional equipment may be added to a welding cell in order to resurface electrodes to have desired patterns. Electrodes may also be prepared offline, although this is not preferred since the relatively rapid wear/deterioration caused by welding processes would make on-line resurfacing better suited for minimizing production disruption and enabling continuous production in a high volume environment. For example, where an electrode is used in a weld gun incorporated within a robot welding machine, the robot arm may be used to move a used electrode with an eroded electrode weld face within the welding cell to a weld face redressing operation as disclosed herein.

This invention provides means of imparting a form or texture to the weld face (also referred to herein as the workpiece-contacting surface) of a resistance spot welding electrode by selective removal or displacement of material to create a surface containing an at least one elevated and/or depressed region. This region is shaped so that the electrode weld face forms an attractive, recognizable, reverse image at the weld site of an article of manufacture. The depressed and/or elevated region may be of uniform or variable depth. Further, the outline or bounds of the depressed region may be random or irregular or may comprise regular geometric elements capable, when viewed as a whole, of forming a recognizable shape.

In many embodiments of the invention, the weld face image region may generally possess some symmetry, but typically it will not be features of circular symmetry centered about either the center of the weld face or the center of the axis of the electrode. It may be preferred to form such circular images by simple rotation of a shaped tool about a symmetry axis. In one embodiment, a durable protective mask is placed over the workpiece contacting surface of the electrode and an abrasive or mechanical material deformation and removal process is applied to the masked surface. The protective mask will prevent material deformation and removal from the masked areas and only the regions of the electrode unprotected by the mask will be exposed and subject to deformation and removal. Thus upon removal of the mask the desired pattern will be visible in the electrode.

In another embodiment the desired pattern may be imparted by electrical discharge machining A high melting point tool complementary in form to the desired electrode pattern is submerged in a suitable dielectric fluid such as kerosene. The electrode is then moved toward the tool so that it is likewise immersed in the dielectric fluid at least to an extent sufficient to cover the patterned area. By establishing a potential difference between the tool and the electrode, an electrical discharge will occur eroding the surface of the electrode and transferring the tool pattern to the workpiece contacting surface, the weld face of the resistance welding electrode.

In still another embodiment, the face end of the electrode may be heated to render it more plastic and driven against a hard tool, complementary in form to the desired pattern, to deform the electrode and thereby transfer the tool pattern to the electrode face.

In yet another embodiment, the electrode face material is a composite with a core fabricated of one material surrounded by a shell of a second material. The variation in properties between the core material and the material surrounding it is then exploited to result in selective material removal or shaping. In some embodiments the cross-sectional shape of the core material may provide the desired image forming region on the weld face of the electrode. For example, materials of different hardnesses will erode at different rates when blasted or brushed as in the first embodiment and, thus, this embodiment could be practiced without use of a mask. Electrochemical differences between core and shell could be exploited by exposing the electrode to a corrosive medium and relying on selective dissolution of core and shell to produce the desired form.

In preferred practices of the invention, such visible image-imparting electrode faces may be prepared in or close by a welding cell in which they are used. One or more of the above described practices for deforming an image on the electrode face would be selected and equipment for its use organized at the weld cell. New electrodes may have their weld faces thus formed, and used electrodes with eroded face images may be redressed in or near the welding cell to accommodate welding line speeds and productivity requirements. Since the initial dressing of the weld face and required redressing may remove electrode material, the length of a new electrode would be specified to accommodate such depletion of electrode material.

Other objects and advantages of the invention will be apparent from the following descriptions of embodiments of the practice of the invention.

BRIEF DESCRIPTION OF THE DRAWINGS

FIG. 5 illustrates an embodiment of the invention whereby the workpiece contacting surface of the electrode is shaped by upsetting.

FIG. 6A illustrates an embodiment of the invention whereby the workpiece contacting surface of a composite electrode is shaped by impact of abrasive particles. FIG. 6B illustrates, in flat plan view, an electrode face with an image formed either as a depressed area or elevated area by the abrasive particles of FIG. 6A.

DESCRIPTION OF PREFERRED EMBODIMENTS

Figure 1:
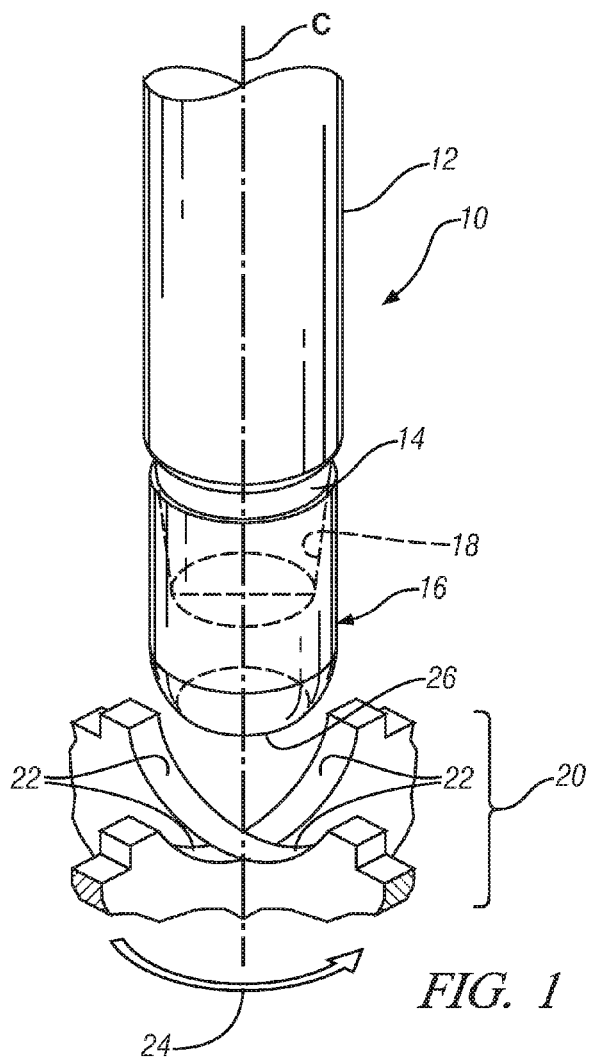
FIG. 1 illustrates an electrode cap dressing operation on a typical resistance spot welding electrode face when mounted in a welding apparatus.

A spot welding electrode has the general appearance of a hollow cylinder, open at one end and closed at the other. In operation, the open end is removably mounted to the welding apparatus using a male or female taper and the closed end has some specific geometric form to render it suitable for conducting a spot welding process on sheet metal workpieces. During repetitive welding operations, the original geometric form is subject to degradation by either erosion and workpiece adhesion, or deformation, or both which progressively modify its geometry and render it less suitable for its intended purpose.

Historically, the weld face was not shaped to form an image in the welded surface and this deterioration in welding electrode performance was compensated for by modifying the welding conditions. For welding of steel or galvanized steel, this usually required increasing or 'stepping' the current with increasing numbers of welds according to some predetermined scheme. The intent being to maintain current density and heat input to ensure at least a minimum weld nugget size. At some point, however, the electrode deterioration progressed to a point where either further modification of the weld schedule was impractical or the electrode weld face had grown too large for the available weld surface and the weld electrode was discarded and replaced with a new electrode. For aluminum welding, electrode deterioration was compensated for by using modified parameters, i.e., very short weld times and electrodes with small weld faces.

More recent practice has been to minimize weld process changes by restricting 'stepping' and machining the weld electrode, 'cap dressing', to re-create its original geometry after relatively minimal deterioration has occurred. This dressing approach is much more effective in controlling heat input to the weld over the life of the electrode; in controlling the weld face size for weld placement in confined areas; in reducing electrical demand; in extending the life of the electrode; and in maintaining consistent, high quality welds.

Cap dressing is usually done frequently, after approximately 200 welds, to minimize the quantity of material removed with each dressing. Since it is a machining process conducted on a relatively easily machined workpiece, conventional tool materials are used such as coated tool steels (for example grades S7 or M2) or carbide inserts are used and dressing is performed with the electrode mounted in its working configuration. The workpiece-contacting surface or weld face of most commonly-used electrodes is axially symmetrical, possessing a shape such as a dome, a flat surface or a generally convex form. Hence dressing may be performed using a single tool or several tools in a common holder mounted in fixed relation to one another. Often, the tool form comprises only one half of the desired electrode geometry and the electrode geometry is created by rotation of the tool(s) about an axis aligned with the centerline of the electrode. In other cases the tool may comprise three or four cutting surfaces or blades that cooperatively shape the electrode face as illustrated in FIG. 1.

FIG. 1 illustrates a portion of a weld apparatus 10 comprising a shank 12 with a tapered end 14 to which weld electrode 16 is removably attached through frictional interference between a matching taper 18 on the inner surface of the weld cap and taper 14 on the shank 12. In this embodiment weld electrode may be formed of a high conductivity copper alloy. A dressing cutter assembly 20, arbitrarily shown with four cutting edges 22 is supported in a device (not shown) capable of supporting the cutting loads while rotating the assembly 20 around axis C, for example in the direction indicated by arrow 24. Note that axis C is an axis of axisymmetric symmetry passing through the centerline of the shank and weld electrode. The interaction of the weld electrode 16 with the rotating cutter blades will generate the desired rounded workpiece-contacting surface 26 on electrode 16. In this embodiment, at this stage of processing, the workpiece-contacting surface 26 has not yet been prepared to impose a desired image in the workpiece surface contacted by electrode 16.

FIG. 1 is intended to be illustrative and not limiting. In many cases the dressed weld face will not be along the cylinder axis, but will be deliberately tilted relative to the cylinder axis to provide for better part access during welding. Also, the workpiece contacting faces, shown as dome-shaped, may adopt other, rotationally symmetric forms. For example the workpiece contacting surfaces are typically flat for steel and convex for aluminum.

This invention is intended to further modify the workpiece-contacting electrode surface after it has been shaped to a desired size and general shape, either by the manufacturer or by dressing in service to maintain the manufacturer's original form.

This invention is applicable to any workpiece but is especially suitable for the non-ferrous, aluminum and magnesium-based workpieces which are now assuming greater prominence in automobile body construction due to their reduced density (relative to steel).

Resistance spot welding is always practiced to avoid the formation of a molten pool of the workpiece alloy on the surfaces of the workpieces in contact with the weld cap. However the surfaces of the workpieces directly under the electrodes are heated to an elevated temperature and, in consequence are more plastic than they would be at room temperature or at about 25° C. Thus the workpiece surfaces may be impressed under the pressure applied to the weld zone through the electrodes and take on the form of the workpiece-contacting surface of the electrode.

However, the workpiece-contacting surface of the electrode will be re-shaped by dressing at regular intervals, thus any decorative or functional form imparted to the electrodes initially will need to be re-created after cap dressing. Further, for maximum efficiency, the procedure followed in re-creating the form imparted to the electrodes should not require their removal from the welding apparatus but, like cap dressing, should be performed in situ.

Figure 2:
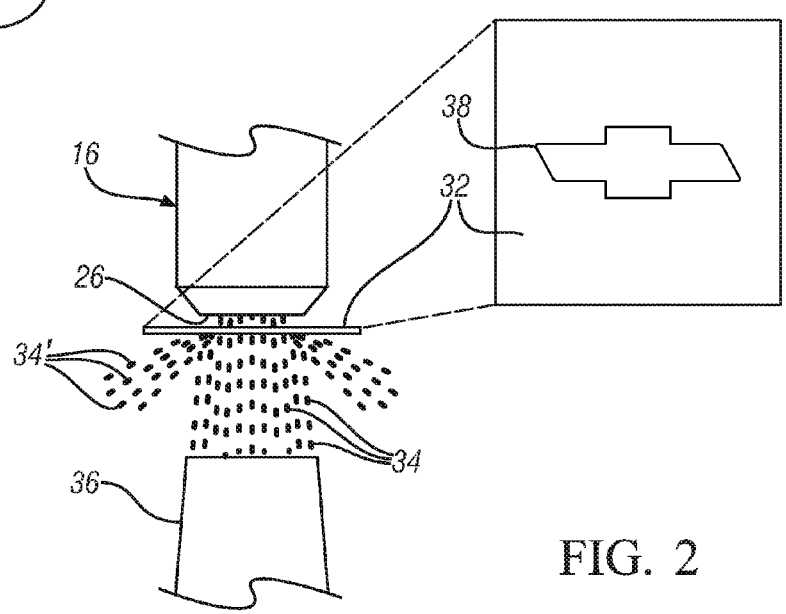
FIG. 2 illustrates an embodiment of the invention whereby the workpiece contacting surface of the electrode is selectively abraded by impact with selectively-masked abrasive particles. This figure also illustrates an offset and rotated image of a mask for selectively allowing abrasive particles to shape the face of the electrode.
Figure 3:
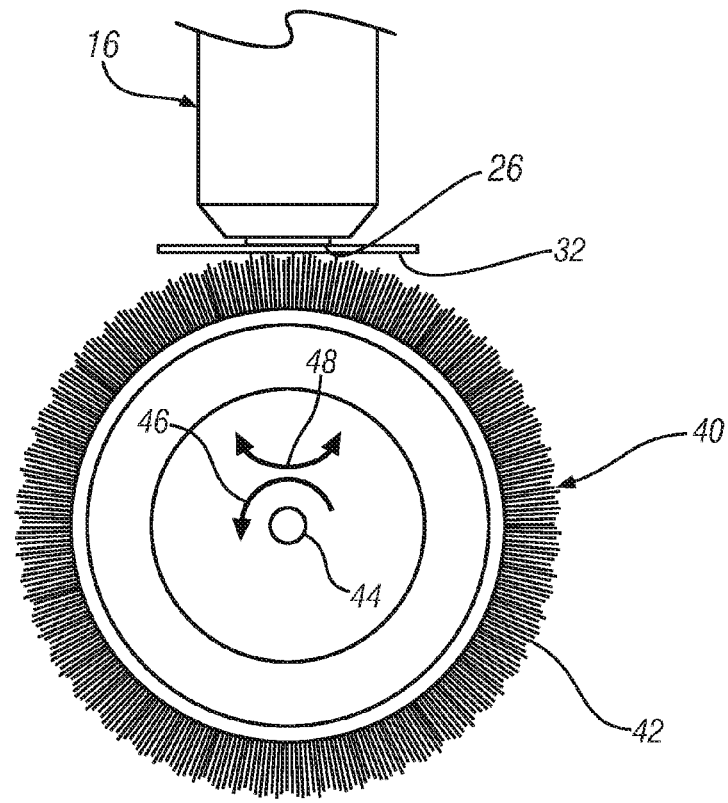
FIG. 3 illustrates an embodiment of the invention whereby the workpiece contacting surface of the electrode is abraded by a rotating wire brush in a pattern determined by a mask interposed between the brush and the electrode.

In a first embodiment, shown in FIGS. 2 and 3, an abrasive material removal process is used to create a 1 µm to 30 µm Ra rough surface. One such abrasive removal process, shown in FIG. 2, is grit blasting which may be performed using sand or steel grit media propelled against the surface by means of a high pressure (50 to 150 pounds per square inch) gas flow. Alternatively the cap may be brushed with stainless steel wire or silicon carbide-impregnated nylon brushes as shown in FIG. 3. Independently of the abrasive removal process selected, a mask with suitably-shaped opening is interposed between the abrasive medium and the weld cap. The mask will partially restrict access of the abrasive to the cap and thereby ensure that the abrasive process will create the desired form on the weld cap. Such a mask is usually used where the weld face presents a uniform composition across the face to the abrasive removal process.

In FIG. 2, electrode 16 is subjected to a stream of abrasive particles 34 ejected from nozzle 36. Mask 32, incorporating an opening 38, by way of example shown as a recognizable vehicle identifying logo, is interposed between nozzle 36 and electrode 16 so that only a portion of particles 34 pass through opening 38 and impinge on electrode 16. The remaining particles impact the mask and are deflected as particles 34' without impacting electrode 16. The kinetic energy of impinging particles 34 will lead to deformation of the weld cap on its workpiece-contacting surface 26 and may, depending on both their energy and their angle of impingement, also abrade the surface. Thus, a deformed and possibly abraded and depressed region corresponding to the form of mask opening 38 will be created on the workpiece-contacting surface 26 of the electrode. Of course, the mask may be devised to cause abrasion of a region of an electrode face surrounding a desired image forming area so that the image on the face extends axially beyond the abraded regions.

In the case of brushing, a similar configuration as shown in FIG. 3 is employed. Again a mask 32 with an opening (not shown) is interposed between electrode 16 and an abrasive medium, here wires or similarly abrasive devices 42 mounted on a wheel 40, are in contact with workpiece-contacting surface 26 only in those regions where openings are present in mask 32. Thus the wires or similar deform and remove material from electrode 16 due to abrasive action resulting from the rotation of wheel 40 about axle 44 in direction 46. Wheel 40 may be maintained in a fixed orientation relative to the electrode to create a pattern of oriented scratches or wheel 40 may be bodily rotated or oscillated as indicated by double arrow 48 to establish a more random scratch pattern.

Since both grit blasting and wire bushing are global material deformation and/or removal processes, the specified shape or desired pattern of surface 26 is only established by selective masking of the electrode so that the abrasive can only access a fragment of the workpiece-contacting surface. Also these processes will generally create relatively shallow features and thus the imprint left in the workpiece will be rendered less visible after the vehicle is painted. In consequence these processes may be more suitable for imparting patterns on workpieces which are either left unpainted after welding or which have a much thinner paint layer than is typical of conventional paint practice.

Figure 4:
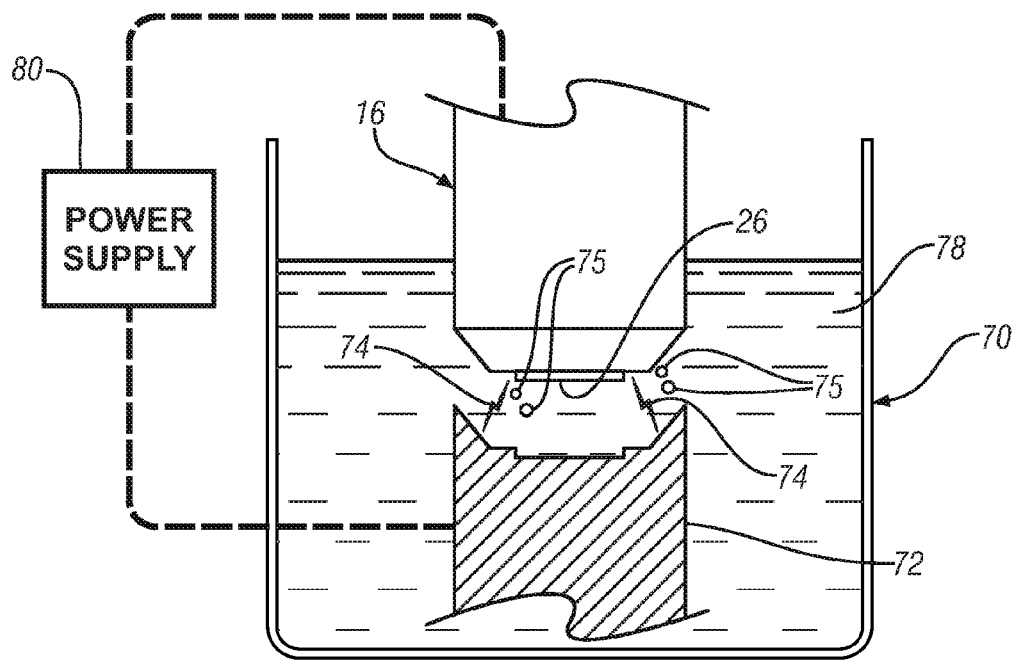
FIG. 4 illustrates an embodiment of the invention whereby the workpiece contacting surface of the electrode is shaped by electrical discharge machining.

In a second embodiment, shown in FIG. 4, the pattern is imparted by electrical discharge machining and is capable of developing patterns with substantial differences in elevation on the electrode. An overview of the process is indicated at 70. By immersing the workpiece-contacting surface of the electrode in a bath of circulating (circulation system not shown) liquid dielectric 78, for example kerosene, and applying an increasing electrical potential, generated by power supply 80, between the electrode and a tool, an electrical discharge 74 will result. This discharge will vaporize a portion of the electrode 16 and a portion of the tool 72. However by fabricating the tool of a material with a high melting point and thus a high vaporization temperature, such as graphite or any of the refractory metals, the bulk of the vaporization will occur at the lower melting point copper-based electrode. This will introduce small particles of condensed copper-based alloy 75 into the electrolyte. Discharges will occur first at the regions of smallest separation between tool and electrode and repetition of this process will remove an increasing volume of electrode surface and progressively transfer the inverse of the tool shape of tool 72 to the workpiece-contacting surface 26 of cap 16. The efficiency of the process depends only on the relative melting points of the tool and workpiece and not on their hardnesses. Hence graphite is a very suitable tool material, since unlike refractory metals it may be readily reshaped with conventional cutting tools. Thus when a graphite tool 72 wears to the point where the fidelity of the image it generates is inadequate, the desired form may be easily re-established.

In a third embodiment, illustrated in FIG. 5, the desired pattern may be imparted to the electrode by a mechanical upsetting process resulting from contact with a die as shown at 60. The electrode 16 is deformed by contact with rigid tool 62. Thus, the inverse geometry of the contact surface 66 of tool 62 is transferred to workpiece-contacting surface 26 of electrode 16. The required contact pressure P between the tool and the electrode may be generated by the weld apparatus or externally generated, for example by electromagnetically or explosively accelerating a compact tool electromagnetically to impact the electrode (not shown).

Preferably the electrode 16 will be heated to a temperature sufficient to reduce its flow stress prior to upsetting, for example by exposure to a tool 62 which has been heated by heater elements 64. Alternatively the electrode may be heated by passage of electric current through the electrode. An appropriate upsetting temperature will be alloy specific but will generally range from about 350° C. to about 750° C.

Unlike the previous embodiments, the upsetting process will displace material rather than remove it. Thus depending on the nature of the pattern it may be desirable to first imprint the pattern on the worn electrode and then perform the dressing operation to remove material displaced upward, away from the electrode weld face. This will be most important for deep patterns which cover a large fraction of the workpiece-contacting electrode face resulting in a large volume of displaced metal.

The processes and procedures so far described are suitable for weld electrodes of homogeneous composition and microstructure. Often, such electrodes are formed from high-copper alloys of substantially pure copper to maintain high electrical conductivity. However, high-copper alloys for welding electrodes may be obtained in varying grades including, by way of example only, some in which the copper contains small amounts of zirconium; or chromium; or chromium and zirconium in combination; or beryllium; or a dispersion of aluminum oxide. These additions are made to harden the electrode, particularly at elevated temperatures. It is therefore feasible, for example by co-extruding an ingot with a core of one alloy and a shell or cladding of a second alloy to produce a composite electrode. Further by shaping the core in a desired fashion, the form of the core may be exposed on the workpiece-contacting face by exploiting the property variation which will accompany the alloy or compositional variation. Thus, in a fourth embodiment, the desired form of the workpiece-contacting electrode face is established by: first manufacturing a composite electrode whose core has a predetermined shape or form; exposing the composite electrode to a material-removing environment; and utilizing the differential responses of the core and cladding to the material-removing environment to achieve a suitably contoured workpiece-contacting electrode surface.

For example, consider the electrode configuration depicted in FIG. 6A which shows a composite electrode 16' comprising a core 19 of dispersion-strengthened copper with a somewhat less wear resistant cladding 17 of zirconium-containing copper alloy. When abraded by wire brushing or, as shown, grit blasting by abrasive particles 34 ejected from nozzle 36, the cladding 17 and core 19 regions of this composite electrode will abrade unequally. In this example, the cladding 17 will recede with respect to the core 19 and the shape of core 19 will remain more prominent as a protrusion in the eight-ray star shape illustrated in the flat plan view of FIG. 6B. Thus, depending on the relative wear resistance of the cladding 17 and core 19 regions of the weld face, the core 19 may extend above, or be recessed below, the weld face level of cladding 17. Either way, the abraded core 19 and cladding 17 portions of the composite workpiece-contacting surface 26' will cooperate to form a star image in a sheet metal weld surface formed using electrode 16'.

Figure 7A:
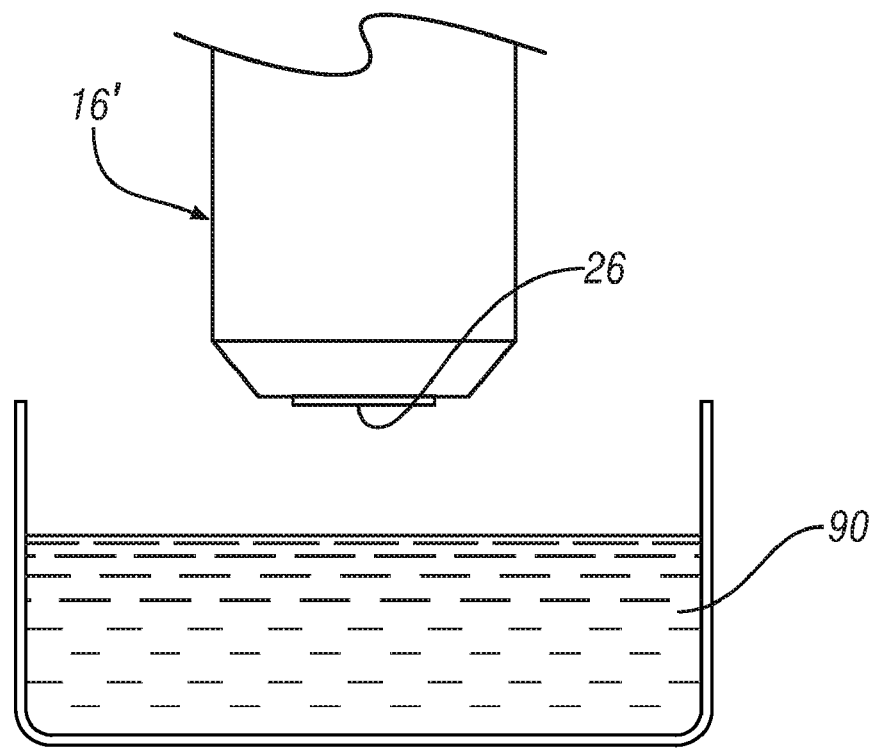
FIG. 7A illustrates an embodiment of the invention whereby the workpiece contacting surface of a composite electrode is shaped by chemical dissolution.
Figure 7B:
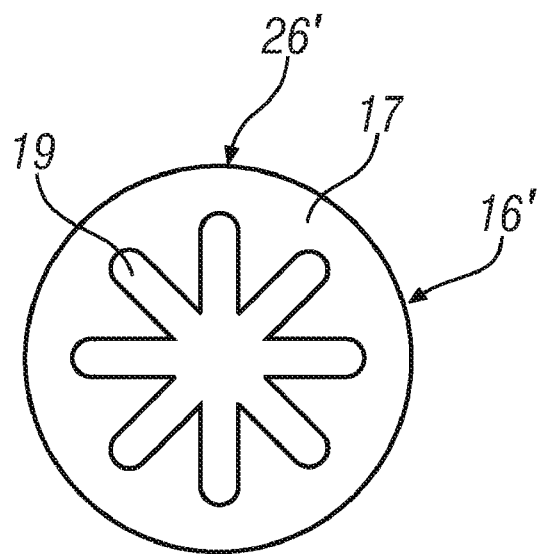
FIG. 7B illustrates, in flat plan view, an electrode face with an image formed either as a depressed area or as an elevated area by the chemical dissolution process of FIG. 7A.

In FIG. 7A, a similar situation is shown but here the difference between the core 19 and the cladding 17 which is exploited is their chemical reactivity. Thus subjecting the composite electrode 16' to chemical or electrochemical reaction, for example by immersion in a chemical solution 90 will lead to differing rates of chemical removal of the core 19 and cladding 17 regions. This difference in chemical reactivity of the electrode materials permits the formation of an elevated or recessed star-shaped core 19 as illustrated in the plan view of FIG. 7B. Again, the chemically eroded core 19 and cladding 17 portions of the composite workpiece-contacting surface 26' will cooperate to form a protruding or recessed star image in a sheet metal weld-site surface formed using electrode 16'.

Practices of the invention have been illustrated in which the weld face of a resistance weld electrode has been shaped to form a multi-ray star image and a bow-tie image. Practices of the invention are considered suitable for forming many different visible images on a weldment that provide a viewer with perceived sense of quality. When it is desired to form one or more circular images on the workpiece contacting surface of an electrode it may be more practical to form the image by using a cutting tool and rotating it relative to the center axis of the electrode and against the weld face. However, where the desired image does not have such circular symmetry, the forming practices of this invention may be used with efficiency and effectiveness.

The invention has been detailed as it would be practiced in a first application, but as has been described, electrodes are subject to wear and erosion and the images imparted to the electrodes will, with repeated use, lose fidelity. This loss of fidelity may be detected manually by an operator or inspector or, alternatively, by automated vision-based inspection systems incorporating cameras, frame grabbers and feature-identifying computing systems such as are well known to those skilled in the art. Once a threshold lack of image fidelity is detected the electrode may be reprocessed as described above. Such reprocessing may be conducted in a welding cell with the electrode mounted on the weld machine or welding robot. In this case suitable dressing and image-imparting means would be brought to the welding machine, or, more preferably the motor characteristics of the welding machine would be employed to convey the electrode to a proximate dressing and image-imparting station. Alternatively the electrode caps could be removed from the welding machine, conveyed to a remote dressing and image-imparting station, suitably restored, returned to the welding machine and re-installed on the welding machine. It will be appreciated that locating the dressing and image-imparting station capability proximate to enable electrode processing while mounted on the welding machine will minimize production downtime and is preferred in high production rate applications.

These descriptions of the invention are merely exemplary in nature and, thus, variations that do not depart from the gist of the invention are intended to be within the scope of the invention. Such variations are not to be regarded as a departure from the spirit and scope of the invention.

The invention claimed is:

1. A method of preparing a resistance spot welding electrode for imparting a visible image on a weldment, the electrode having a generally round cylindrical body with a cylinder axis and a workpiece-contacting surface at one end of the body, the method comprising:

shaping the electrode to create a generally flat or convex-shaped workpiece-contacting surface on the electrode;

interposing a mask between the workpiece-contacting surface of the electrode and an abrasive medium to restrict access of the abrasive medium to the workpiece-contacting surface, the mask having at least one opening enabling access of the abrasive medium to the workpiece-contacting surface; and using the abrasive medium to selectively shape portions of the workpiece-contacting surface of the electrode with image-forming features other than for creating features of circular symmetry centered about the weld face of the electrode body, the image forming features comprising protrusions and/or intrusions extending, respectively, above or below adjacent regions of the workpiece contacting surface such that the workpiece-contacting surface imposes a visible reverse image in a weldment formed on a metal workpiece.

2. The method of claim 1 wherein the abrasive medium comprises abrasive particles.

3. The method of claim 1 wherein the abrasive medium comprises a wire brush.

4. A method of preparing a resistance spot welding electrode for imparting a visible image on a weldment, the electrode having a generally round cylindrical body with a cylinder axis and a workpiece-contacting surface at one end of the body, the workpiece-contacting surface end of the electrode body having one or more image surface regions displaying a reverse shape of a desired image and image boundary regions enclosing the image surface regions, the image surface regions and image boundary regions being disposed generally co-axially with the cylinder axis and formed of different electrode compositions that respond differently to a selected process for removal of electrode material in development of image forming features on the workpiece-contacting surface, the method comprising:

shaping the electrode to create a suitably-shaped workpiece-contacting surface on the electrode; and simultaneously exposing the image surface regions and image boundary regions to a material removal process that selectively removes electrode material to leave protrusions and/or intrusions in the image surface regions extending, respectively, above or below adjacent image boundary regions of the workpiece-contacting surface such that the workpiece-contacting surface is suitable for imposing a visible reverse image in a weldment formed on a metal workpiece.

5. The method of claim 4 wherein the workpiece-contacting surface of the electrode is selectively shaped using an abrasive medium.

6. The method of claim 5 wherein the abrasive medium comprises abrasive grit.

7. The method of claim 4 wherein the workpiece-contacting surface of the electrode is selectively shaped by dissolution in a chemical solution.

8. The method of claim 4 wherein the workpiece-contacting surface of the electrode is selectively shaped by electrically-enhanced dissolution in a chemical solution.

9. A method of operating an electrical resistance welding operation in which a welding machine arm at a welding station presses the workpiece-contacting face of a generally round cylindrical weld electrode against the surface of a metal workpiece, the method comprising:

(a) selectively shaping the weld face of the electrode with image-forming features other than for creating features of circular symmetry centered about the weld face of the electrode body, the image forming features comprising protrusions and/or intrusions in the workpiece-contacting surface such that the surface imposes a visible reverse image in a weldment formed on the metal workpiece;

(b) using the welding machine arm and weld electrode to form many welds in which each weldment bears the reverse image;

(c) using an automated vision system to determine when the image on the weld face no longer produces the visible reverse image; and (d) re-shaping the weld face at the welding station as specified in step (a).

10. The method of claim 9 wherein the workpiece-contacting surface of the electrode is selectively shaped using an abrasive medium.

11. The method of claim 9 wherein the workpiece-contacting surface of the electrode is selectively shaped by dissolution in a chemical solution.

12. A method of preparing a resistance spot welding electrode for imparting a visible image on a weldment, the electrode having a generally round cylindrical body with a cylinder axis and a workpiece-contacting surface at one end of the body, the method comprising:

shaping the electrode to create a generally flat or convex-shaped workpiece-contacting surface on the electrode; and using electrical discharge machining to selectively shape portions of the workpiece-contacting surface of the electrode with image-forming features other than for creating features of circular symmetry centered about the weld face of the electrode body, the image forming features comprising protrusions and/or intrusions extending, respectively, above or below adjacent regions of the workpiece contacting surface such that the workpiece-contacting surface imposes a visible reverse image in a weldment formed on a metal workpiece.

13. A method of preparing a resistance spot welding electrode for imparting a visible image on a weldment, the electrode having a generally round cylindrical body with a cylinder axis and a workpiece-contacting surface at one end of the body, the method comprising:

shaping the electrode to create a generally flat or convex-shaped workpiece-contacting surface on the electrode; and upsetting the electrode to selectively shape portions of the workpiece-contacting surface of the electrode with image-forming features other than for creating features of circular symmetry centered about the weld face of the electrode body, the image forming features comprising protrusions and/or intrusions extending, respectively, above or below adjacent regions of the workpiece contacting surface such that the workpiece-contacting surface imposes a visible reverse image in a weldment formed on a metal workpiece; and dressing the selectively shaped workpiece contacting surface to remove displaced material away from the image forming features.

14. The method of claim 13 wherein the upsetting is performed at a temperature of between 350° C. and 750° C.

15. A method of operating an electrical resistance welding operation in which a welding machine arm at a welding station presses the workpiece-contacting face of a generally round cylindrical weld electrode against the surface of a metal workpiece, the method comprising:

(a) selectively shaping the weld face of the electrode with image-forming features other than for creating features of circular symmetry centered about the weld face of the electrode body, the image forming features comprising protrusions and/or intrusions in the workpiece-contacting surface such that the surface imposes a visible reverse image in a weldment formed on the metal workpiece;

(b) using the welding machine arm and weld electrode to form many welds in which each weldment bears the reverse image;

(c) removing the weld electrode from the welding machine arm;

(d) conveying the weld electrode to a remote dressing and image-imparting station;

(e) re-shaping the weld face as specified in step (a) at the remote dressing and image-imparting station; and (f) returning the weld electrode to the welding station and re-installing the weld electrode on the welding machine arm.

\* \* \* \* \*